US011645298B1

United States Patent
Dageville et al.

(10) Patent No.: US 11,645,298 B1
(45) Date of Patent: *May 9, 2023

(54) CONFIGURING MANAGED EVENT TABLES USING EXECUTION NODE PROCESSES

(71) Applicant: Snowflake Inc., Bozeman, MT (US)

(72) Inventors: Benoit Dageville, San Mateo, CA (US); Ganeshan Ramachandran Iyer, Redmond, WA (US); Unmesh Jagtap, San Mateo, CA (US); Subramanian Muralidhar, Mercer Island, WA (US)

(73) Assignee: Snowflake Inc., Bozeman, MT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/934,857

(22) Filed: Sep. 23, 2022

Related U.S. Application Data

(63) Continuation of application No. 17/649,571, filed on Feb. 1, 2022, now Pat. No. 11,487,778.

(60) Provisional application No. 63/263,737, filed on Nov. 8, 2021.

(51) Int. Cl.
*G06F 16/25* (2019.01)
*G06F 16/22* (2019.01)

(52) U.S. Cl.
CPC ........ *G06F 16/254* (2019.01); *G06F 16/2282* (2019.01); *G06F 16/258* (2019.01)

(58) Field of Classification Search
CPC .......................... G06F 16/1734; G06F 15/177
USPC ....................................................... 707/602
See application file for complete search history.

(56) References Cited

U.S. PATENT DOCUMENTS

| 2014/0280162 | A1 | 9/2014 | Halpern | |
|---|---|---|---|---|
| 2016/0275101 | A1* | 9/2016 | Hinterbichler | ...... G06F 16/1734 |
| 2018/0081924 | A1* | 3/2018 | Johnston | ............... G06F 16/278 |
| 2019/0238635 | A1* | 8/2019 | Ng | ........................ G06F 16/954 |

OTHER PUBLICATIONS

"U.S. Appl. No. 17/649,571, Examiner Interview Summary dated Jun. 30, 2022", 2 pgs.
"U.S. Appl. No. 17/649,571, Non Final Office Action dated Mar. 25, 2022", 11 pgs.
"U.S. Appl. No. 17/649,571, Notice of Allowance dated Jul. 14, 2022", 8 pgs.
"U.S. Appl. No. 17/649,571, Response filed Jun. 27, 2022 to Non Final Office Action dated Mar. 25, 2022", 19 pgs.

* cited by examiner

*Primary Examiner* — Hung T Vy
(74) *Attorney, Agent, or Firm* — Schwegman Lundberg & Woessner, P.A.

(57) ABSTRACT

Techniques for configuring managed event tables include generating at a first process of an execution node, log data associated with execution of user-defined function (UDF) code. The log data is provided from the first process to a second process of the execution node. The first process is configured as a sub-process of the second process. The log data is formatted using the second process of the execution node, to generate formatted log data. The formatting is based on a configuration of a managed event table that is external to the execution node. The formatted log data is communicated from the second process of the execution node into a managed event table maintained at a computing node that is external to the execution node.

30 Claims, 7 Drawing Sheets

US 11,645,298 B1

CONFIGURING MANAGED EVENT TABLES USING EXECUTION NODE PROCESSES

PRIORITY CLAIM

This application is a Continuation of U.S. patent application Ser. No. 17/649,571, filed Feb. 1, 2022 and entitled "MANAGED EVENT TABLES IN A DATABASE SYSTEM," which claims the benefit of priority to U.S. Provisional Patent Application 63/263,737, filed Nov. 8, 2021, and entitled "MANAGED EVENT TABLES," which applications are incorporated herein by reference in their entireties.

TECHNICAL FIELD

Embodiments of the disclosure relate generally to databases and, more specifically, to managed event tables for logging data from User-Defined Functions (UDFs) executing in a secure environment.

BACKGROUND

Databases are widely used for data storage and access in computing applications. A goal of database storage is to provide enormous sums of information in an organized manner so that it can be accessed, managed, updated, and shared. In a database, data may be organized into rows, columns, and tables. Databases are used by various entities and companies for storing information that may need to be accessed or analyzed.

Cloud-based data warehouses and other cloud database systems or data platforms sometimes provide support for UDFs that enable such systems to perform operations that are not available through the built-in, system-defined functions. However, for mitigating security risks, security mechanisms associated with user code executing on such systems can be used.

Some programs execute on multi-tenant cloud environments, and their programs include UDFs. To provide security, the programs can be executed in safe environments. However, by executing in the safe environments, the UDFs are not able to log data.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
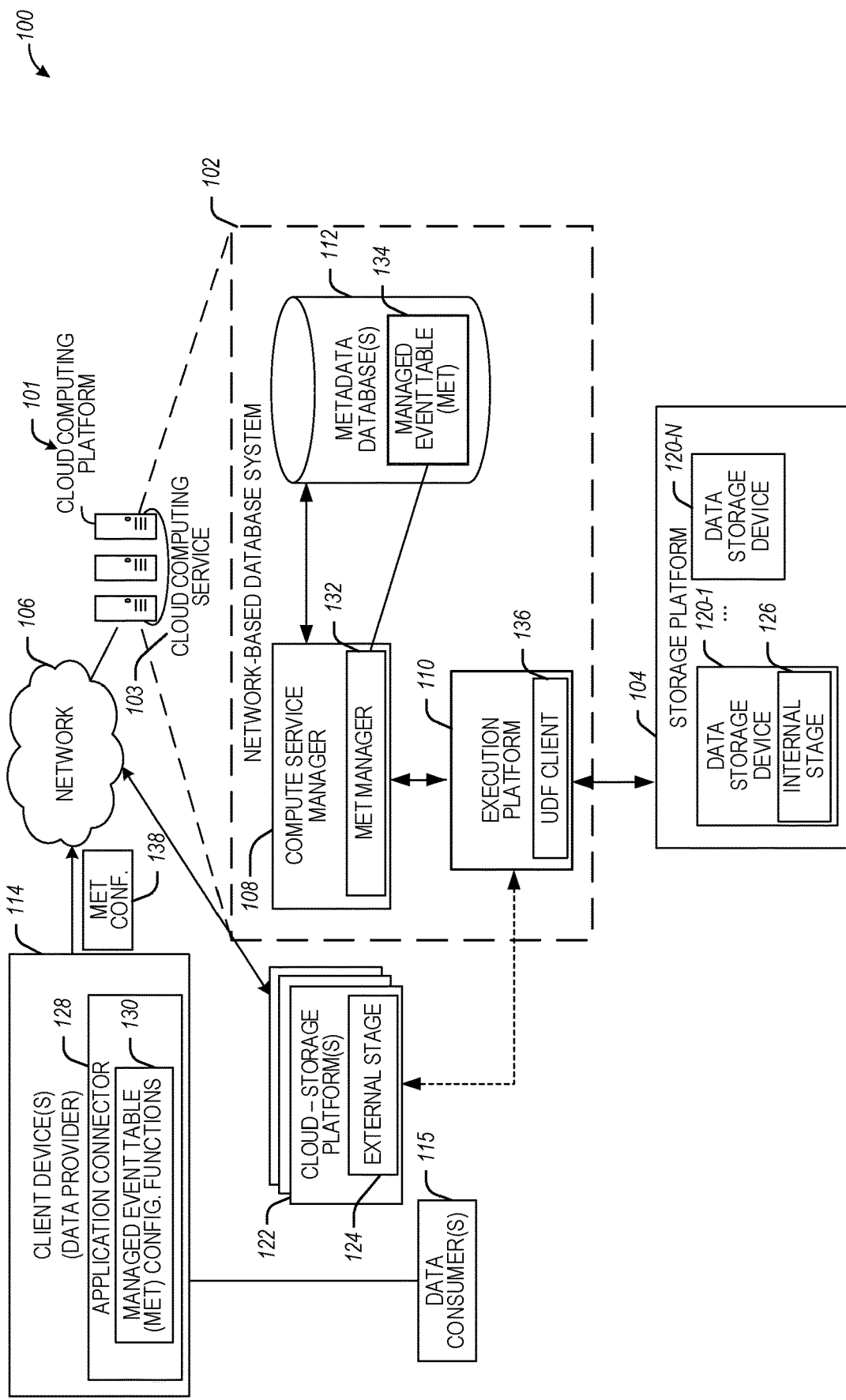
FIG. 1 illustrates an example computing environment that includes a network-based database system in communication with a cloud storage platform, in accordance with some embodiments of the present disclosure.

Reference will now be made in detail to specific example embodiments for carrying out the inventive subject matter. Examples of these specific embodiments are illustrated in the accompanying drawings, and specific details are outlined in the following description to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

In the present disclosure, physical units of data that are stored in a data platform and that make up the content of, e.g., database tables in customer accounts are referred to as micro-partitions. In different implementations, a data platform may store metadata in micro-partitions as well. The term "micro-partitions" is distinguished in this disclosure from the term "files," which, as used herein, refers to data units such as image files (e.g., Joint Photographic Experts Group (JPEG) files, Portable Network Graphics (PNG) files, etc.), video files (e.g., Moving Picture Experts Group (MPEG) files, MPEG-4 (MP4) files, Advanced Video Coding High Definition (AVCHD) files, etc.), Portable Document Format (PDF) files, documents that are formatted to be compatible with one or more word-processing applications, documents that are formatted to be compatible with one or more spreadsheet applications, and/or the like. If stored internal to the data platform, a given file is referred to herein as an "internal file" and may be stored in (or at, or on, etc.) what is referred to herein as an "internal storage location." If stored external to the data platform, a given file is referred to herein as an "external file" and is referred to as being stored in (or at, or on, etc.) what is referred to herein as an "external storage location." These terms are further discussed below.

Computer-readable files come in several varieties, including unstructured files, semi-structured files, and structured files. These terms may mean different things to different people. As used herein, examples of unstructured files include image files, video files, PDFs, audio files, and the like; examples of semi-structured files include JavaScript Object Notation (JSON) files, eXtensible Markup Language (XML) files, and the like; and examples of structured files include Variant Call Format (VCF) files, Keithley Data File (KDF) files, Hierarchical Data Format version 5 (HDF5) files, and the like. As known to those of skill in the relevant arts, VCF files are often used in the bioinformatics field for storing, e.g., gene-sequence variations, KDF files are often used in the semiconductor industry for storing, e.g., semiconductor-testing data, and HDF5 files are often used in industries such as the aeronautics industry, in that case for storing data such as aircraft-emissions data. Numerous other example unstructured-file types, semi-structured-file types, and structured-file types, as well as example uses thereof, could certainly be listed here as well and will be familiar to those of skill in the relevant arts. Different people of skill in the relevant arts may classify types of files differently among these categories and may use one or more different categories instead of or in addition to one or more of these.

Data platforms are widely used for data storage and data access in computing and communication contexts. Concerning architecture, a data platform could be an on-premises data platform, a network-based data platform (e.g., a cloud-based data platform), a combination of the two, and/or include another type of architecture. Concerning the type of data processing, a data platform could implement online analytical processing (OLAP), online transactional processing (OLTP), a combination of the two, and/or another type of data processing. Moreover, a data platform could be or include a relational database management system (RDBMS) and/or one or more other types of database management systems.

In a typical implementation, a data platform may include one or more databases that are respectively maintained in association with any number of customer accounts (e.g., accounts of one or more data providers), as well as one or more databases associated with a system account (e.g., an administrative account) of the data platform, one or more other databases used for administrative purposes, and/or one or more other databases that are maintained in association with one or more other organizations and/or for any other purposes. A data platform may also store metadata (e.g., account object metadata) in association with the data platform in general and in association with, for example, particular databases and/or particular customer accounts as well. Users and/or executing processes that are associated with a given customer account may, via one or more types of clients, be able to cause data to be ingested into the database, and may also be able to manipulate the data, add additional data, remove data, run queries against the data, generate views of the data, and so forth. As used herein, the terms "account object metadata" and "account object" are used interchangeably.

In an implementation of a data platform, a given database (e.g., a database maintained for a customer account) may reside as an object within, e.g., a customer account, which may also include one or more other objects (e.g., users, roles, grants, shares, warehouses, resource monitors, integrations, network policies, and/or the like). Furthermore, a given object such as a database may itself contain one or more objects such as schemas, tables, materialized views, and/or the like. A given table may be organized as a collection of records (e.g., rows) so that each includes a plurality of attributes (e.g., columns). In some implementations, database data is physically stored across multiple storage units, which may be referred to as files, blocks, partitions, micro-partitions, and/or by one or more other names. In many cases, a database on a data platform serves as a backend for one or more applications that are executing on one or more application servers.

In computer security, a sandbox (e.g., sandbox environment) is a security mechanism for separating running programs, usually to prevent system failures or prevent exploitation of software vulnerabilities. A sandbox can be used to execute untested or untrusted programs or code, possibly from unverified or untrusted third parties, suppliers, users, or web sites, without risking harm to the host machine or operating system. A sandbox can provide a tightly controlled set of resources for guest programs to run in, such as storage and memory scratch space. Network access, the ability to inspect the host system or read from input devices can be disallowed or restricted. UDFs typically can run in a sandbox environment.

Logging from UDFs is important for debuggability during development and troubleshooting issues in production. Some existing solutions recommend users to log to tables from the UDF, but this approach is not scalable and a UDF typically does not allow running SQL queries. Moreover, logging to tables is not the normal procedure that programmers are accustomed to when using programming languages (e.g., Java, Python, etc.).

A log may be a record of transactions or activities that take place on a computer system. In one aspect, systems and methods are presented to provide managed event tables for generating log data from UDFs executing in a secure sandbox environment. Log data is treated as sensitive and handled with appropriate security policies, as with any other user data in the system. As used herein, the terms "event table" (ET) and "managed event table" (MET) are interchangeable and indicate a table used as a destination for logs/metrics associated with UDF execution. For example, a MET is a type of table in an event-driven architecture that is provided as a destination for log data generated from UDFs executing in a sandboxed environment. Users can query a MET in the same way as a regular table. In some embodiments, a MET can be attached to an object (e.g., an Account object, a Database object, a Schema object, etc.) and can be used as the destination for logs/metrics originating from objects under that parent object. In some embodiments, a MET can be attached to an Account object, with the parent object of the MET being a schema object. Additional configurations associated with a MET are further discussed at least in connection with FIGS. 4-6.

The various embodiments that are described herein are described with reference where appropriate to one or more of the various figures. An example computing environment including a compute service manager with a MET manager configured to perform MET configuration functions are discussed in connection with FIGS. 1-3. An example MET manager and MET configuration functions are discussed in connection with FIGS. 4-6. A more detailed discussion of example computing devices that may be used with the disclosed techniques is provided in connection with FIG. 7.

FIG. 1 illustrates an example computing environment 100 that includes a database system in the example form of a network-based database system 102, in accordance with some embodiments of the present disclosure. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not specifically described herein. In other embodiments, the computing environment may comprise another type of network-based database system or a cloud data platform. For example, in some aspects, the computing environment 100 may include a cloud computing platform 101 with the network-based database system 102, and a storage platform 104 (also referred to as a cloud storage platform). The cloud computing platform 101 provides computing resources and storage resources that may be acquired (purchased) or leased and configured to execute applications and store data.

The cloud computing platform 101 may host a cloud computing service 103 that facilitates storage of data on the cloud computing platform 101 (e.g., data management and access) and analysis functions (e.g. SQL queries, analysis), as well as other processing capabilities (e.g., configuring replication group objects as described herein). The cloud computing platform 101 may include a three-tier architecture: data storage (e.g., storage platforms 104 and 122), an execution platform 110 (e.g., providing query processing), and a compute service manager 108 providing cloud services.

It is often the case that organizations that are customers of a given data platform also maintain data storage (e.g., a data lake) that is external to the data platform (i.e., one or more external storage locations). For example, a company could be a customer of a particular data platform and also separately maintain storage of any number of files—be they unstructured files, semi-structured files, structured files, and/or files of one or more other types—on, as examples, one or more of their servers and/or on one or more cloud-storage platforms such as AMAZON WEB SERVICES™ (AWS™), MICROSOFT® AZURE®, GOOGLE CLOUD PLATFORM™, and/or the like. The customer's servers and cloud-storage platforms are both examples of what a given customer could use as what is referred to herein as an external storage location. The cloud computing platform 101 could also use a cloud-storage platform as what is referred to herein as an internal storage location concerning the data platform.

From the perspective of the network-based database system 102 of the cloud computing platform 101, one or more files that are stored at one or more storage locations are referred to herein as being organized into one or more of what is referred to herein as either "internal stages" or "external stages." Internal stages are stages that correspond to data storage at one or more internal storage locations, and where external stages are stages that correspond to data storage at one or more external storage locations. In this regard, external files can be stored in external stages at one or more external storage locations, and internal files can be stored in internal stages at one or more internal storage locations, which can include servers managed and controlled by the same organization (e.g., company) that manages and controls the data platform, and which can instead or in addition include data-storage resources operated by a storage provider (e.g., a cloud-storage platform) that is used by the data platform for its "internal" storage. The internal storage of a data platform is also referred to herein as the "storage platform" of the data platform. It is further noted that a given external file that given customer stores at a given external storage location may or may not be stored in an external stage in the external storage location—i.e., in some data-platform implementations, it is a customer's choice whether to create one or more external stages (e.g., one or more external-stage objects) in the customer's data-platform account as an organizational and functional construct for conveniently interacting via the data platform with one or more external files.

As shown, the network-based database system 102 of the cloud computing platform 101 is in communication with the cloud storage platforms 104 and 122 (e.g., AWS®, Microsoft Azure Blob Storage®, or Google Cloud Storage). The network-based database system 102 is a network-based system used for reporting and analysis of integrated data from one or more disparate sources including one or more storage locations within the cloud storage platform 104. The cloud storage platform 104 comprises a plurality of computing machines and provides on-demand computer system resources such as data storage and computing power to the network-based database system 102.

The network-based database system 102 comprises a compute service manager 108, an execution platform 110, and one or more metadata databases 112. The network-based database system 102 hosts and provides data reporting and analysis services to multiple client accounts.

The compute service manager 108 coordinates and manages operations of the network-based database system 102. The compute service manager 108 also performs query optimization and compilation as well as managing clusters of computing services that provide compute resources (also referred to as "virtual warehouses"). The compute service manager 108 can support any number of client accounts such as end-users providing data storage and retrieval requests, system administrators managing the systems and methods described herein, and other components/devices that interact with compute service manager 108.

The compute service manager 108 is also in communication with a client device 114. The client device 114 corresponds to a user of one of the multiple client accounts supported by the network-based database system 102. A user may utilize the client device 114 to submit data storage, retrieval, and analysis requests to the compute service manager 108. Client device 114 (also referred to as remote computing device or user device 114) may include one or more of a laptop computer, a desktop computer, a mobile phone (e.g., a smartphone), a tablet computer, a cloud-hosted computer, cloud-hosted serverless processes, or other computing processes or devices may be used (e.g., by a data provider) to access services provided by the cloud computing platform 101 (e.g., cloud computing service 103) by way of a network 106, such as the Internet or a private network. A data consumer 115 can use another computing device to access data of the data provider (e.g., data obtained via the client device 114).

In the description below, actions are ascribed to users, particularly consumers and providers. Such actions shall be understood to be performed concerning client device (or devices) 114 operated by such users. For example, notification to a user may be understood to be a notification transmitted to client device 114, input or instruction from a user may be understood to be received by way of the client device 114, and interaction with an interface by a user shall be understood to be interaction with the interface on the client device 114. In addition, database operations (joining, aggregating, analysis, etc.) ascribed to a user (consumer or provider) shall be understood to include performing such actions by the cloud computing service 103 in response to an instruction from that user.

In some embodiments, the client device 114 is configured with an application connector 128, which may be configured to perform managed event table (MET) configuration functions 130. For example, client device 114 can be associated with a data provider using the cloud computing service 103 of the network-based database system 102. In some embodiments, MET configuration functions 130 include generating MET configurations 138 for communication to the network-based database system 102 via the network 106. For example, MET configurations 138 can be communicated to the MET manager 132 within the compute service manager 108. The MET manager 132 is configured to perform MET configuration functions which can be based (at least partially) on one or more of the MET configurations 138. For example, the MET manager 132 can configure MET 134 based on the MET configurations 138, with the MET 134 used in connection with logging data associated with a UDF execution. In some aspects, the UDF execution can be configured using the UDF client 136 which is part of the execution platform 110.

The compute service manager 108 is also coupled to one or more metadata databases 112 that store metadata about various functions and aspects associated with the network-based database system 102 and its users. For example, a metadata database 112 may include a summary of data stored in remote data storage systems as well as data available from a local cache. Additionally, a metadata database 112 may include information regarding how data is organized in remote data storage systems (e.g., the cloud storage platform 104) and the local caches. Information stored by a metadata database 112 allows systems and services to determine whether a piece of data needs to be accessed without loading or accessing the actual data from a storage device. In some embodiments, metadata database 112 is configured to store account object metadata (e.g., account objects used in connection with a replication group object). Additionally, the metadata database 112 can also store the MET 134. In some embodiments, MET 134 can be stored in storage platform 104 or cloud-storage platforms 122.

Figure 3:
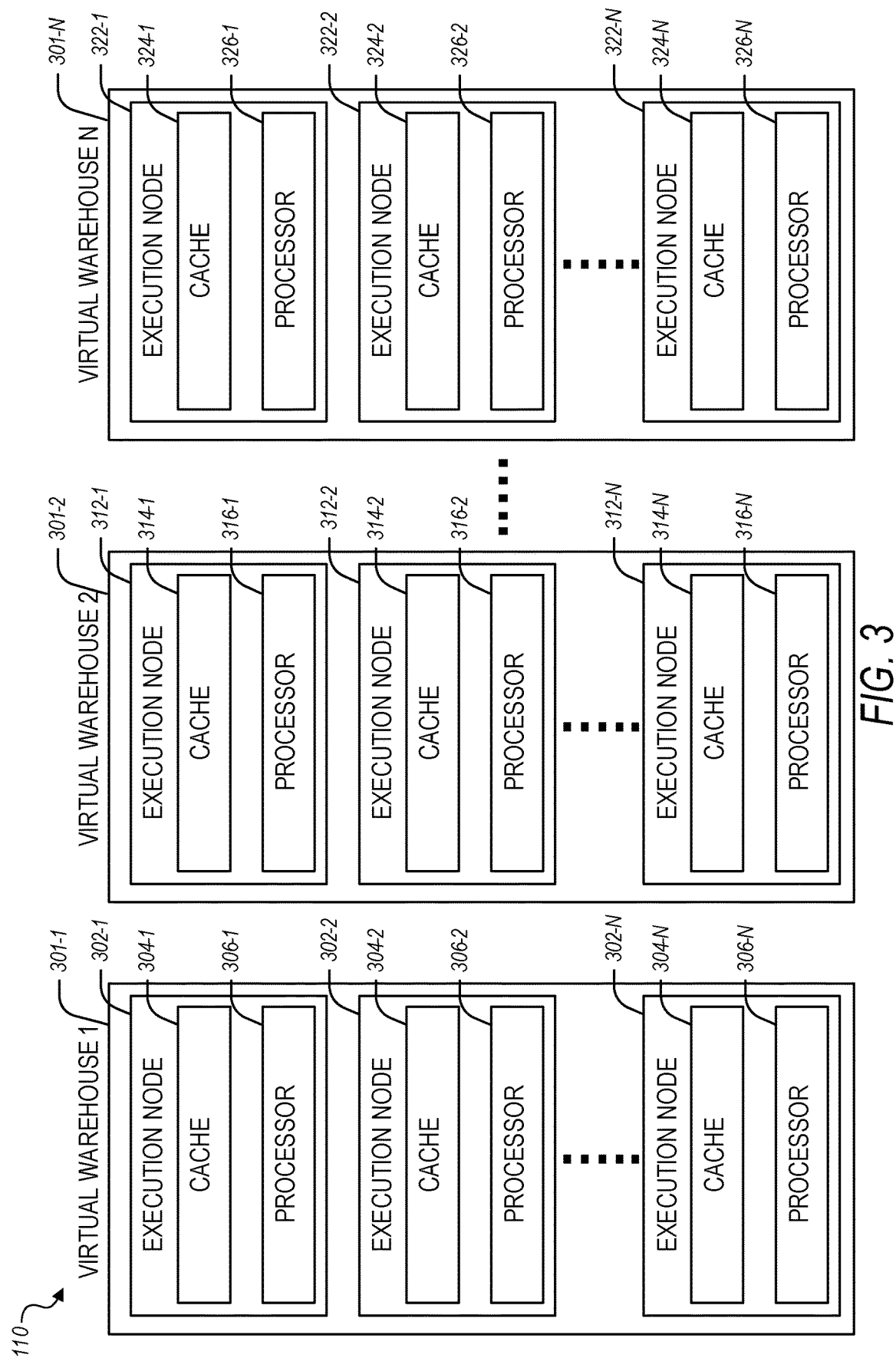
FIG. 3 is a block diagram illustrating components of an execution platform, in accordance with some embodiments of the present disclosure.

The compute service manager 108 is further coupled to the execution platform 110, which provides multiple computing resources that execute various data storage and data retrieval tasks. As illustrated in FIG. 3, the execution platform 110 comprises a plurality of compute nodes. The execution platform 110 is coupled to storage platform 104 and cloud storage platforms 122. The storage platform 104 comprises multiple data storage devices 120-1 to 120-N. In some embodiments, the data storage devices 120-1 to 120-N are cloud-based storage devices located in one or more geographic locations. For example, the data storage devices 120-1 to 120-N may be part of a public cloud infrastructure or a private cloud infrastructure. The data storage devices 120-1 to 120-N may be hard disk drives (HDDs), solid-state drives (SSDs), storage clusters, Amazon S3™ storage systems, or any other data-storage technology. Additionally, the cloud storage platform 104 may include distributed file systems (such as Hadoop Distributed File Systems (HDFS)), object storage systems, and the like. In some embodiments, at least one internal stage 126 may reside on one or more of the data storage devices 120-1-120-N, and at least one external stage 124 may reside on one or more of the cloud storage platforms 122.

In some embodiments, as mentioned above, the compute service manager 108 includes the MET manager 132. The MET manager 132 comprises suitable circuitry, interfaces, logic, and/or code and is configured to perform the disclosed functionalities associated with configuration and use of METs in connection with log data (or another type of data) associated with UDF execution. For example and as discussed in connection with FIGS. 4-5, MET manager 132 can configure generation, processing (e.g., via MET components 413), and ingestion (e.g., via ingestion component 502) of log data (e.g., log data 508) into MET 134. Additional functionalities associated with MET configuration are discussed in connection with FIGS. 4-6.

In some embodiments, communication links between elements of the computing environment 100 are implemented via one or more data communication networks. These data communication networks may utilize any communication protocol and any type of communication medium. In some embodiments, the data communication networks are a combination of two or more data communication networks (or sub-Networks) coupled to one another.

In alternate embodiments, these communication links are implemented using any type of communication medium and any communication protocol.

The compute service manager 108, metadata database(s) 112, execution platform 110, and storage platform 104, are shown in FIG. 1 as individual discrete components. However, each of the compute service manager 108, metadata database(s) 112, execution platform 110, and storage platform 104 may be implemented as a distributed system (e.g., distributed across multiple systems/platforms at multiple geographic locations). Additionally, each of the compute service manager 108, metadata database(s) 112, execution platform 110, and storage platform 104 can be scaled up or down (independently of one another) depending on changes to the requests received and the changing needs of the network-based database system 102. Thus, in the described embodiments, the network-based database system 102 is dynamic and supports regular changes to meet the current data processing needs.

During a typical operation, the network-based database system 102 processes multiple jobs determined by the compute service manager 108. These jobs are scheduled and managed by the compute service manager 108 to determine when and how to execute the job. For example, the compute service manager 108 may divide the job into multiple discrete tasks and may determine what data is needed to execute each of the multiple discrete tasks. The compute service manager 108 may assign each of the multiple discrete tasks to one or more nodes of the execution platform 110 to process the task. The compute service manager 108 may determine what data is needed to process a task and further determine which nodes within the execution platform 110 are best suited to process the task. Some nodes may have already cached the data needed to process the task and, therefore, be a good candidate for processing the task. Metadata stored in a metadata database 112 assists the compute service manager 108 in determining which nodes in the execution platform 110 have already cached at least a portion of the data needed to process the task. One or more nodes in the execution platform 110 process the task using data cached by the nodes and, if necessary, data retrieved from the cloud storage platform 104. It is desirable to retrieve as much data as possible from caches within the execution platform 110 because the retrieval speed is typically much faster than retrieving data from the cloud storage platform 104.

As shown in FIG. 1, the cloud computing platform 101 of the computing environment 100 separates the execution platform 110 from the storage platform 104. In this arrangement, the processing resources and cache resources in the execution platform 110 operate independently of the data storage devices 120-1 to 120-N in the cloud storage platform 104. Thus, the computing resources and cache resources are not restricted to specific data storage devices 120-1 to 120-N. Instead, all computing resources and all cache resources may retrieve data from, and store data to, any of the data storage resources in the cloud storage platform 104.

Figure 2:
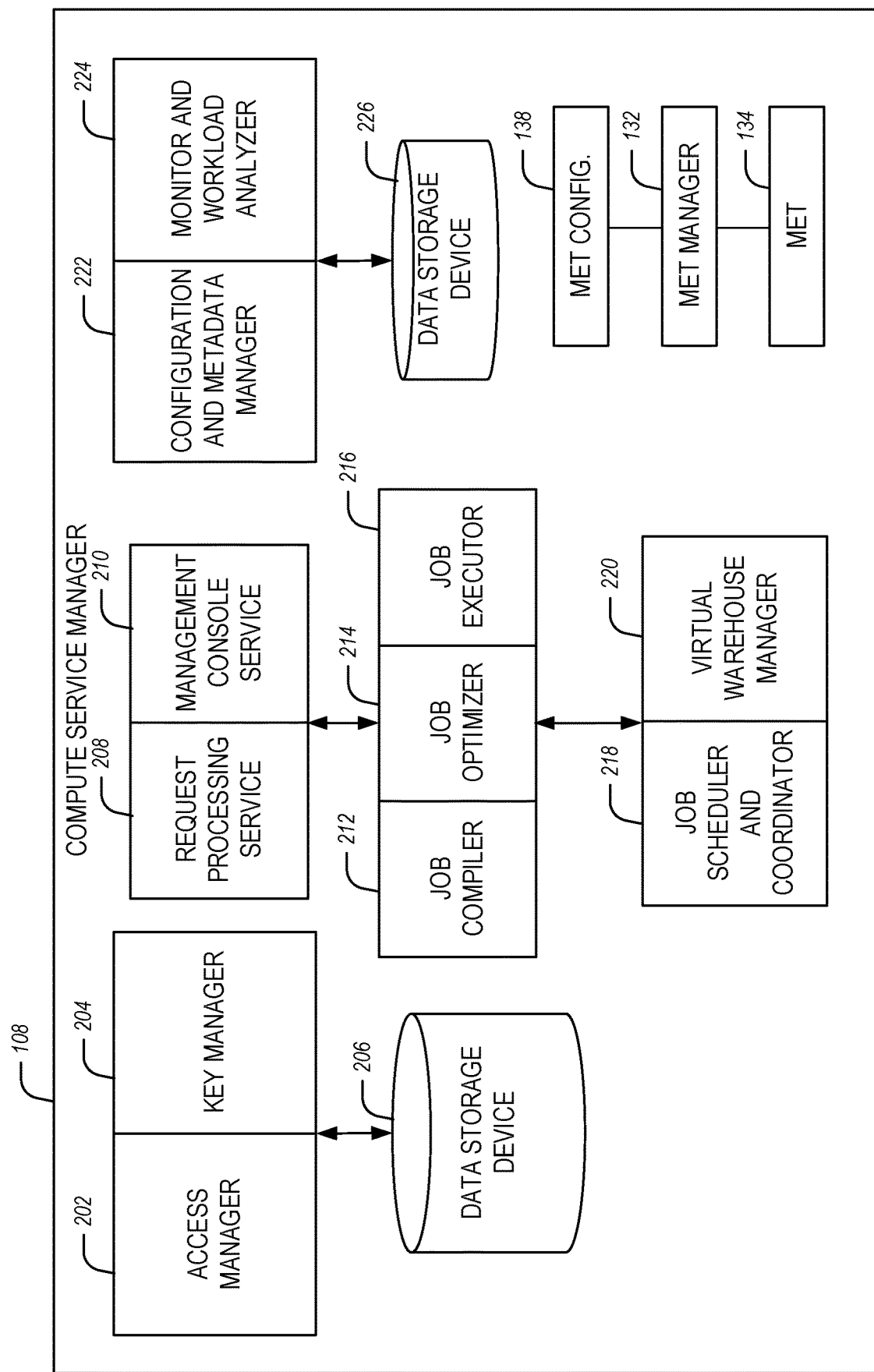
FIG. 2 is a block diagram illustrating the components of a compute service manager, in accordance with some embodiments of the present disclosure.

FIG. 2 is a block diagram illustrating components of the compute service manager 108, in accordance with some embodiments of the present disclosure. As shown in FIG. 2, the compute service manager 108 includes an access manager 202 and a credential management system (or key manager) 204 coupled to an access metadata database 206, which is an example of the metadata database(s) 112. Access manager 202 handles authentication and authorization tasks for the systems described herein. The credential management system 204 facilitates the use of remotely stored credentials to access external resources such as data resources in a remote storage device. As used herein, the remote storage devices may also be referred to as "persistent storage devices" or "shared storage devices." For example, the credential management system 204 may create and maintain remote credential store definitions and credential objects (e.g., in the access metadata database 206). A remote credential store definition identifies a remote credential store and includes access information to access security credentials from the remote credential store. A credential object identifies one or more security credentials using non-sensitive information (e.g., text strings) that are to be retrieved from a remote credential store for use in accessing an external resource. When a request invoking an external resource is received at run time, the credential management system 204 and access manager 202 use information stored in the access metadata database 206 (e.g., a credential object and a credential store definition) to retrieve security credentials used to access the external resource from a remote credential store.

A request processing service 208 manages received data storage requests and data retrieval requests (e.g., jobs to be performed on database data). For example, the request processing service 208 may determine the data to process a received query (e.g., a data storage request or data retrieval request). The data may be stored in a cache within the execution platform 110 or in a data storage device in storage platform 104.

A management console service 210 supports access to various systems and processes by administrators and other system managers. Additionally, the management console service 210 may receive a request to execute a job and monitor the workload on the system.

The compute service manager 108 also includes a job compiler 212, a job optimizer 214, and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. Job optimizer 214 also handles various data pruning operations and other data optimization techniques to improve the speed and efficiency of executing the job. The job executor 216 executes the execution code for jobs received from a queue or determined by the compute service manager 108.

A job scheduler and coordinator 218 sends received jobs to the appropriate services or systems for compilation, optimization, and dispatch to the execution platform 110. For example, jobs may be prioritized and then processed in that prioritized order. In an embodiment, the job scheduler and coordinator 218 determines a priority for internal jobs that are scheduled by the compute service manager 108 with other "outside" jobs such as user queries that may be scheduled by other systems in the database but may utilize the same processing resources in the execution platform 110. In some embodiments, the job scheduler and coordinator 218 identifies or assigns particular nodes in the execution platform 110 to process particular tasks. A virtual warehouse manager 220 manages the operation of multiple virtual warehouses implemented in the execution platform 110. For example, the virtual warehouse manager 220 may generate query plans for executing received queries.

Additionally, the compute service manager 108 includes a configuration and metadata manager 222, which manages the information related to the data stored in the remote data storage devices and the local buffers (e.g., the buffers in execution platform 110). The configuration and metadata manager 222 uses metadata to determine which data files need to be accessed to retrieve data for processing a particular task or job. A monitor and workload analyzer 224 oversees processes performed by the compute service manager 108 and manages the distribution of tasks (e.g., workload) across the virtual warehouses and execution nodes in the execution platform 110. The monitor and workload analyzer 224 also redistributes tasks, as needed, based on changing workloads throughout the network-based database system 102 and may further redistribute tasks based on a user (e.g., "external") query workload that may also be processed by the execution platform 110. The configuration and metadata manager 222 and the monitor and workload analyzer 224 are coupled to a data storage device 226. The data storage device 226 in FIG. 2 represents any data storage device within the network-based database system 102. For example, data storage device 226 may represent buffers in execution platform 110, storage devices in storage platform 104, or any other storage device.

As described in embodiments herein, the compute service manager 108 validates all communication from an execution platform (e.g., the execution platform 110) to validate that the content and context of that communication are consistent with the task(s) known to be assigned to the execution platform. For example, an instance of the execution platform executing a query A should not be allowed to request access to data-source D (e.g., data storage device 226) that is not relevant to query A. Similarly, a given execution node (e.g., execution node 302-1) may need to communicate with another execution node (e.g., execution node 302-2), and should be disallowed from communicating with a third execution node (e.g., execution node 312-1) and any such illicit communication can be recorded (e.g., in a log or other location). Also, the information stored on a given execution node is restricted to data relevant to the current query and any other data is unusable, rendered so by destruction or encryption where the key is unavailable.

As previously mentioned, the compute service manager 108 includes the MET manager 132 configured to perform the disclosed functionalities associated with the configuration (e.g., using MET configurations 138) and use of one or more METS (e.g., MET 134) for storage and access of log data associated with UDF execution. Additional functionalities performed by the MET manager 132 are discussed in connection with at least FIGS. 4-7.

FIG. 3 is a block diagram illustrating components of the execution platform 110, in accordance with some embodiments of the present disclosure. As shown in FIG. 3, the execution platform 110 includes multiple virtual warehouses, including virtual warehouse 1 (or 301-1), virtual warehouse 2 (or 301-2), and virtual warehouse N (or 301-N). Each virtual warehouse includes multiple execution nodes that each include a data cache and a processor. The virtual warehouses can execute multiple tasks in parallel by using multiple execution nodes. As discussed herein, the execution platform 110 can add new virtual warehouses and drop existing virtual warehouses in real-time based on the current processing needs of the systems and users. This flexibility allows the execution platform 110 to quickly deploy large amounts of computing resources when needed without being forced to continue paying for those computing resources when they are no longer needed. All virtual warehouses can access data from any data storage device (e.g., any storage device in the cloud storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary.

Each virtual warehouse is capable of accessing any of the data storage devices 120-1 to 120-N shown in FIG. 1. Thus, the virtual warehouses are not necessarily assigned to a specific data storage device 120-1 to 120-N and, instead, can access data from any of the data storage devices 120-1 to 120-N within the cloud storage platform 104. Similarly, each of the execution nodes shown in FIG. 3 can access data from any of the data storage devices 120-1 to 120-N. In some embodiments, a particular virtual warehouse or a particular execution node may be temporarily assigned to a specific data storage device, but the virtual warehouse or execution node may later access data from any other data storage device.

In the example of FIG. 3, virtual warehouse 1 includes three execution nodes 302-1, 302-2, and 302-N. Execution node 302-1 includes a cache 304-1 and a processor 306-1. Execution node 302-2 includes a cache 304-2 and a processor 306-2. Execution node 302-N includes a cache 304-N and a processor 306-N. Each execution node 302-1, 302-2, and 302-N is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-N. Execution node 312-1 includes a cache 314-1 and a processor 316-1. Execution node 312-2 includes a cache 314-2 and a processor 316-2. Execution node 312-N includes a cache 314-N and a processor 316-N. Additionally, virtual warehouse 3 includes three execution nodes 322-1, 322-2, and 322-N. Execution node 322-1 includes a cache 324-1 and a processor 326-1. Execution node 322-2 includes a cache 324-2 and a processor 326-2. Execution node 322-N includes a cache 324-N and a processor 326-N.

In some embodiments, the execution nodes shown in FIG. 3 are stateless with respect to the data being cached by the execution nodes. For example, these execution nodes do not store or otherwise maintain state information about the execution node or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each includes one data cache and one processor, alternative embodiments may include execution nodes containing any number of processors and any number of caches. Additionally, the caches may vary in size among the different execution nodes. The caches shown in FIG. 3 store, in the local execution node, data that was retrieved from one or more data storage devices in the cloud storage platform 104. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some embodiments, the caches are implemented using high-speed memory devices that provide fast access to the cached data. Each cache can store data from any of the storage devices in the cloud storage platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor-intensive. Similarly, an execution node may be assigned more cache resources if the tasks performed by the execution node require a larger cache capacity. Further, some nodes may be executing much slower than others due to various issues (e.g., virtualization issues, network overhead). In some example embodiments, the imbalances are addressed at the scan level using a file stealing scheme. In particular, whenever a node process completes scanning its set of input files, it requests additional files from other nodes. If one of the other nodes receives such a request, the node analyzes its own set (e.g., how many files are left in the input file set when the request is received), and then transfers ownership of one or more of the remaining files for the duration of the current job (e.g., query). The requesting node (e.g., the file stealing node) then receives the data (e.g., header data) and downloads the files from the cloud computing storage platform 104 (e.g., from data storage device 120-1), and does not download the files from the transferring node. In this way, lagging nodes can transfer files via file stealing in a way that does not worsen the load on the lagging nodes.

Although virtual warehouses 1, 2, and N are associated with the same execution platform 110, virtual warehouses 1, . . . , N may be implemented using multiple computing systems at multiple geographic locations. For example, virtual warehouse 1 can be implemented by a computing system at a first geographic location, while virtual warehouses 2 and N are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 1 implements execution nodes 302-1 and 302-2 on one computing platform at a geographic location, and execution node 302-N at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 110 is also fault-tolerant. For example, if one virtual warehouse fails, that virtual warehouse is quickly replaced with a different virtual warehouse at a different geographic location.

A particular execution platform 110 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some embodiments, the virtual warehouses may operate on the same data in the cloud storage platform 104, but each virtual warehouse has its execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

Figure 4:
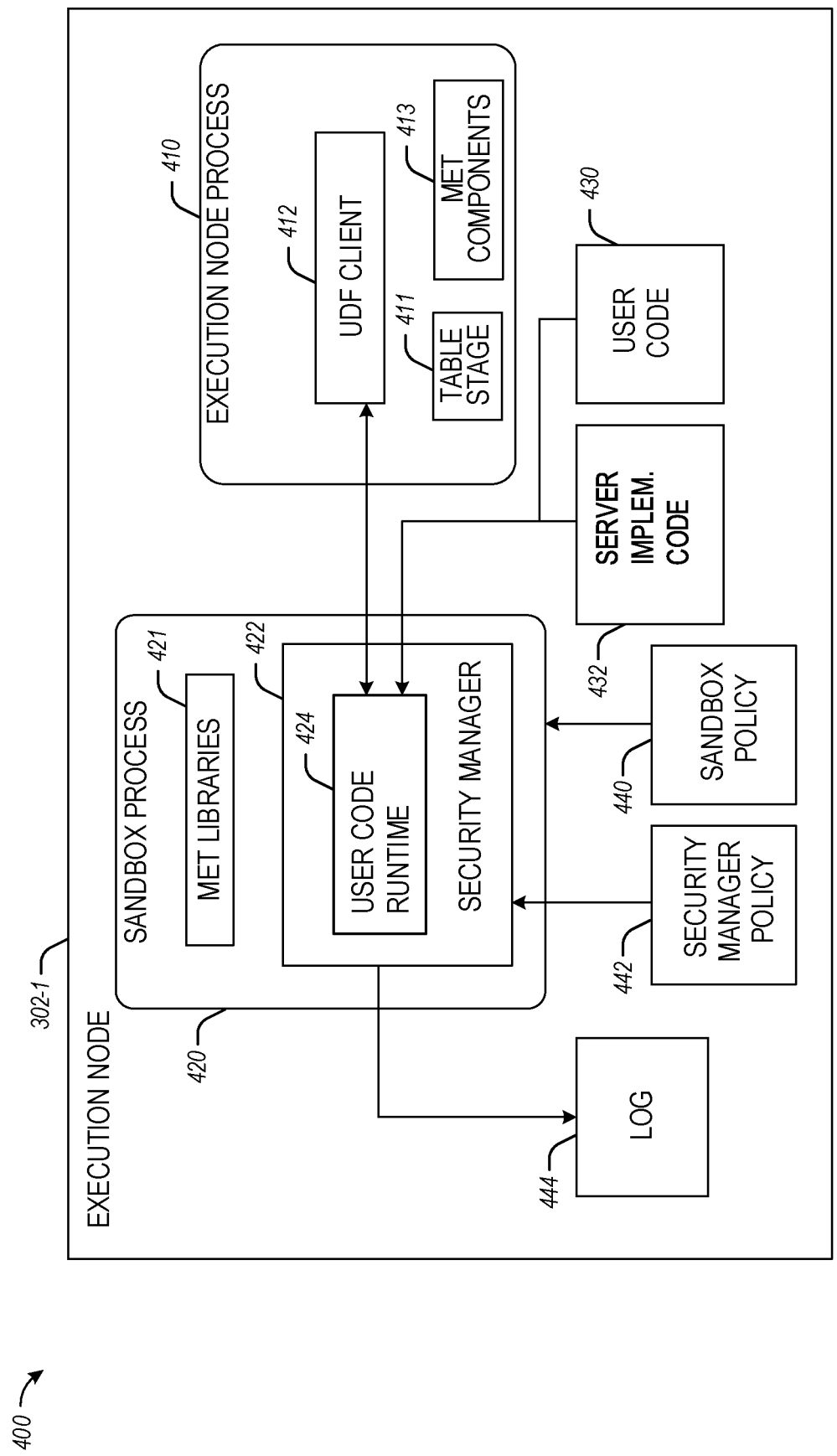
FIG. 4 is a computing environment conceptually illustrating a computing architecture executing a UDF by a process running on a given execution node of the execution platform, in accordance with some embodiments of the present disclosure.

FIG. 4 is a computing environment 400 conceptually illustrating a computing architecture executing a UDF by a process running on a given execution node of the execution platform 110, in accordance with some embodiments of the present disclosure.

In computer security, a sandbox (e.g., sandbox environment) is a security mechanism for separating running programs, usually to mitigate system failures or software vulnerabilities from spreading. A sandbox can be used to execute untested or untrusted programs or code, possibly from unverified or untrusted third parties, suppliers, users, or websites, without risking harm to the host machine or operating system. A sandbox can provide a tightly controlled set of resources for guest programs to run in, such as storage and memory scratch space. Network access, the ability to inspect the host system, or read from input devices can be disallowed or restricted.

As illustrated, the execution node 302-1 from the execution platform 110 includes an execution node process 410, which in an embodiment is running on the processor 306-1 and can also utilize memory from the cache 304-1 (or another memory device or storage). As mentioned herein, a "process" or "computing process" can refer to an instance of a computer program that is being executed by one or more threads by an execution node or execution platform.

As mentioned before, the compute service manager 108 validates all communication from the execution platform 110 to validate that the content and context of that communication are consistent with the task(s) known to be assigned to the execution platform 110. For example, the execution platform 110 executing a query A is not allowed to request access to a particular data source (e.g., data storage device 226 or any one of the storage devices in the cloud storage platform 104) that is not relevant to query A. In an example, the execution node 302-1 may need to communicate with a second execution node (e.g., execution node 302-2), but the security mechanisms described herein can disallow communication with a third execution node (e.g., execution node 312-1). Moreover, any such illicit communication can be recorded (e.g., in a log 444 or other location). Further, the information stored on a given execution node is restricted to data relevant to the current query and any other data is unusable by destruction or encryption where the key is unavailable.

The execution node process 410 is executing a UDF client 412 in the example of FIG. 4. In an embodiment, the UDF client 412 is implemented to support UDFs written in a particular programming language such as JAVA, and the like. In an embodiment, the UDF client 412 is implemented in a different programming language (e.g., C or C++) than the user code 430, which can further improve the security of the computing environment 400 by using a different codebase (e.g., one without the same or fewer potential security exploits).

User code 430 may be provided as a package e.g., in the form of a JAR (JAVA archive) file which includes code for one or more UDFs. Server implementation code 432, in an embodiment, is a JAR file that initiates a server that is responsible for receiving requests from the execution node process 410, assigning worker threads to execute user code, and returning the results, among other types of server tasks.

In an implementation, an operation from a UDF (e.g., a JAVA-based UDF) can be performed by a user code runtime 424 executing within a sandbox process 420 (described further below). In an embodiment, the user code runtime 424 is implemented as a virtual machine, such as a JAVA virtual machine (JVM). Since the user code runtime 424 advantageously executes in a separate process relative to the execution node process 410, there is a lower risk of manipulating the execution node process 410. Results of performing the operation, among other types of information or messages, can be stored in log 444 for review and retrieval. In an embodiment, the log 444 can be stored locally in memory at the execution node 302-1, or a separate location such as the storage platform 104. Moreover, such results can be returned from the user code runtime 424 to the UDF client 412 utilizing a high-performance protocol (e.g., without serialization or deserialization of data, without memory copies; operates on record batches without having to access individual columns, records or cells; utilizes efficient remote procedure call techniques and network protocol(s) for data transfer (e.g., distributed datasets) that further provides authentication and encryption of the data transfer. In an embodiment, the UDF client 412 uses a data transport mechanism that supports a network transfer of columnar data between the user code runtime 424 (and vice-versa) with the aforementioned advantages described above.

Security manager 422, in an example, can prevent completion of an operation from a given UDF by throwing an exception (e.g., if the operation is not permitted), or returns (e.g., doing nothing) if the operation is permitted. In an implementation, the security manager 422 is implemented as a JAVA security manager object that allows applications to implement a security policy such as a security manager policy 442 and enables an application to determine, before performing a possibly unsafe or sensitive operation, what the operation is and whether it is being attempted in a security context that allows the operation to be performed. The security manager policy 442 can be implemented as a file with permissions that the user code runtime 424 is granted. The application (e.g., UDF executed by the user code runtime 424) therefore can allow or disallow the operation based at least in part on the security policy.

Sandbox process 420, in an embodiment, is a sub-process (or a separate process) from the execution node process 410. A sub-process, in an embodiment, refers to a child process of a given parent process (e.g., in this example, the execution node process 410). The sandbox process 420, in an example, is a program that reduces the risk of security breaches by restricting the running environment of untrusted applications using security mechanisms such as namespaces and secure computing modes (e.g., using a system call filter to an executing process and all its descendants, thus reducing the attack surface of the kernel of a given operating system). Moreover, in an example, the sandbox process 420 is lightweight in comparison to the execution node process 410 and is optimized (e.g., closely coupled to security mechanisms of a given operating system kernel) to process a database query securely within the sandbox environment.

In an embodiment, the sandbox process 420 can utilize a virtual network connection to communicate with other components within the subject system. A specific set of rules can be configured for the virtual network connection concerning other components of the subject system. For example, such rules for the virtual network connection can be configured for a particular UDF to restrict the locations (e.g., particular sites on the Internet or components that the UDF can communicate) that are accessible by operations performed by the UDF. Thus, in this example, the UDF can be denied access to particular network locations or sites on the Internet.

The sandbox process 420 can be understood as providing a constrained computing environment for a process (or processes) within the sandbox, where these constrained processes can be controlled and restricted to limit access to certain computing resources.

Examples of security mechanisms can include the implementation of namespaces in which each respective group of processes executing within the sandbox environment has access to respective computing resources (e.g., process IDs, hostnames, user IDs, file names, names associated with network access, and inter-process communication) that are not accessible to another group of processes (which may have access to a different group of resources not accessible by the former group of processes), other container implementations, and the like. By having the sandbox process 420 execute as a sub-process to the execution node process 410, in some embodiments, latency in processing a given database query can be substantially reduced (e.g., a reduction in latency by a factor of 10× in some instances) in comparison with other techniques that may utilize a virtual machine solution by itself.

As further illustrated, the sandbox process 420 can utilize a sandbox policy 440 to enforce a given security policy. The sandbox policy 440 can be a file with information related to a configuration of the sandbox process 420 and details regarding restrictions if any, and permissions for accessing and utilizing system resources. Example restrictions can include restrictions to network access, or file system access (e.g., remapping file system to place files in different locations that may not be accessible, other files can be mounted in different locations, and the like). The sandbox process 420 restricts the memory and processor (e.g., CPU) usage of the user code runtime 424, ensuring that other operations on the same execution node can execute without running out of resources.

As mentioned above, the sandbox process 420 is a sub-process (or separate process) from the execution node process 410, which in practice means that the sandbox process 420 resides in a separate memory space than the execution node process 410. In an occurrence of a security breach in connection with the sandbox process 420 (e.g., by errant or malicious code from a given UDF), if arbitrary memory is accessed by a malicious actor, the data or information stored by the execution node process is protected.

Although the above discussion of FIG. 4 describes components that are implemented using JAVA (e.g., object-oriented programming language), it is appreciated that the other programming languages (e.g., interpreted programming languages) are supported by the computing environment 400. In an embodiment, PYTHON is supported for implementing and executing UDFs in the computing environment 400. In this example, the user code runtime 424 can be replaced with a PYTHON interpreter for executing operations from UDFs (e.g., written in PYTHON) within the sandbox process 420.

In some embodiments, the sandbox process 420 can be used for configuring one or more MET libraries 421 for executing an event table instance (e.g., as discussed in connection with FIG. 5). Additionally, the execution node process can be configured with a table stage 411 and MET components 413 (e.g., components 510-514 in FIG. 5), which can be used in connection with MET-related functions (e.g., as discussed in connection with FIG. 5).

Figure 5:
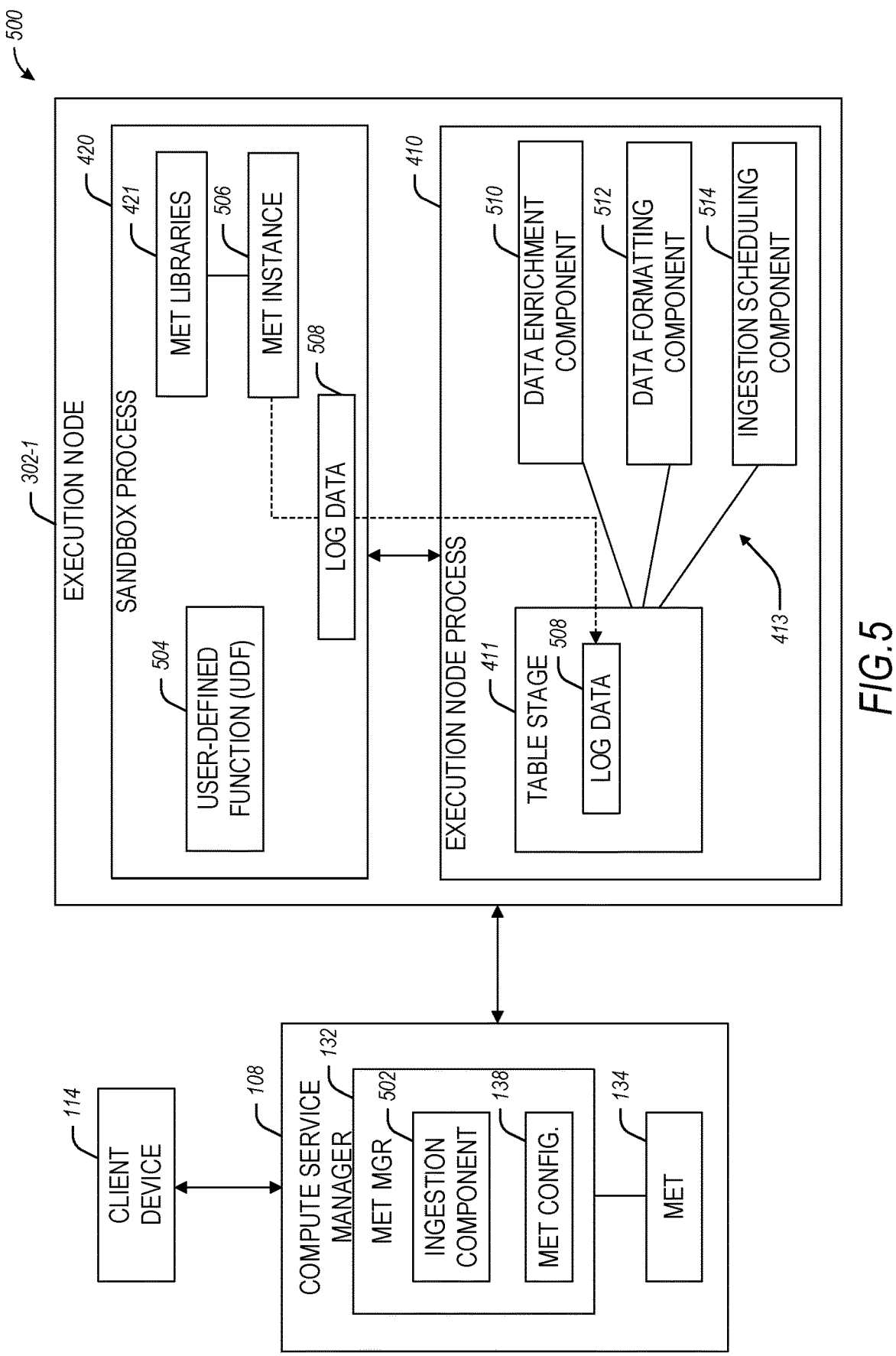
FIG. 5 shows an example of a computing architecture for providing managed event tables for logging data from UDFs executing in a secure environment, in accordance with some embodiments of the present disclosure.

FIG. 5 shows an example of a computing architecture 500 for providing managed event tables for logging data from UDFs executing in a secure environment, according to some example embodiments.

In some aspects, a MET (e.g., MET 134) is configured and managed by the MET manager 132 of the network-based database system 102 and provides functionality that allows users to query the stored log data similar to a regular table. As mentioned above, a MET can be attached to a parent object, such as an account, database, schema, and the like, and provides a destination for log data originating from the parent object and/or any objects under the parent object.

In some embodiments, the network-based database system 102 provides users with an API command for creating a new MET. For example, the API command may be provided in an SQL syntax and allows a user to either create or replace an event table, as well as define a name for the event table. A user may therefore use the API (e.g., via client device 114) to create an event table, thereby causing log data generated by specified UDFs to be automatically collected and entered into the event table. The user may then simply query the event table (e.g., MET 134) to access the stored log data. Implementation and operation of event tables are described in relation to the computing architecture 500 in FIG. 5.

As shown, the computing architecture 500 includes a client device 114, a compute service manager 108, and an execution node 302-1. The execution node 302-1 includes a sandbox process 420 and an execution node process 410. A UDF 504 is executing within the sandbox process 420. The sandbox process 420 separates the UDF 504 from the other services and processes of the computing architecture 500 and may also limit the resources (e.g., storage, memory, etc.) and functionality available to the UDF 504.

The sandbox process 420 is loaded with event table libraries (e.g., MET libraries 421) to facilitate automated logging of the UDF 504 in a MET 134. The MET libraries 421 are programming libraries that cause the execution of a MET instance 506 within the sandbox process 420. The MET instance 506 captures log data 508 generated by the UDF 504 executing in the sandbox process 420. For example, the MET instance 506 may intercept log calls generated by the UDF 504.

The MET instance 506 funnels the captured log data to the execution node process 410. For example, the MET instance 506 may communicate the captured log data 508 to the execution node process 410 using a remote procedure call, (e.g., a Google Remote Procedure Call (gRPC)) that is used to communicate with the execution node process 410.

As shown, the execution node 302-1 is further configured with a table stage 411 and MET components 413, which can be part of the execution node process 410. The MET components 413 include a data enrichment component 510, a data formatting component 512, and an ingestion scheduling component 514. A managed event table (e.g., MET 134) is automatically assigned a table stage 411 where log data associated with the MET 134 is initially stored. Table stage 411 is a storage location that is internal to the execution node process 410. The log data stored at table stage 411 may not be accessible to an end-user. The execution node process 410 stores the log data 508 received from the MET instance 506 in table stage 411.

In some embodiments, the data enrichment component 510 enriches the log data 508 with additional metadata. For example, the metadata may include a timestamp value (e.g., a value identifying the time at which the log data 508 was generated or logged), a query identifier, a session identifier, a warehouse identifier (e.g., a warehouse name), a database name, a schema identifier, a source name, a user name, and the like. The metadata that is added by the data enrichment component 510 may be based on the specifications of a user that created the MET 134, a selected log level, a selected permission level, and the like, which information can be part of the MET configurations 138. In some aspects, the data enrichment component 510 may enrich the log data 508 before the log data is stored in table stage 411 and/or after the log data 508 is stored in table stage 411. In some embodiments, the table schema used by the MET 134 may be preconfigured (e.g., via the MET configurations 138). Accordingly, the data enrichment component 510 may enrich the log data 508 based on the configured schema.

In some embodiments, the execution node process 410 facilitates ingestion of the log data 508 stored in the table stage 411 to the MET 134. For example, the data formatting component 512 formats the log data 508 into a format that is suitable for ingestion into the MET 134, and the ingestion scheduling component 514 schedules ingestion of the formatted log data into the MET 134. In some aspects, formatting the log data includes converting the log data into a file format that is used by the MET 134. For example, the file format used by the MET 134 may be a JSON object, FDN file, and the like.

In some embodiments, the ingestion scheduling component 514 schedules ingestion of the formatted log data by communicating with the ingestion component 502 of the compute service manager 108. In some aspects, the ingestion component 502 may be part of the MET manager 132. For example, the ingestion scheduling component 514 notifies ingestion component 502 that formatted log data is available in table stage 411 and is ready to be ingested into the MET 134. This causes the ingestion component 502 to initiate ingestion of the formatted log data from table stage 411 to the MET 134.

The log data ingested into the MET 134 may be queried by a user. For example, a user may use a remote computing device (e.g., client device 114) to communicate with the compute service manager 108 and initiate queries of the MET 134. In some aspects, MET 134 may provide a limited set of query commands that are available to the user. For example, the query commands may include SHOW, DESC, DROP, TRUNCATE, DELETE, ALTER TABLE ADD/DROP ROW ACCESS POLICY. In some embodiments, other query operations/commands may be disallowed.

In some embodiments, the functionality associated with logging data in the MET 134 may be configurable by a user via the MET configurations 138. For example, the log data that is collected by MET instance 506 and entered into the MET 134 may be configured based on log levels assigned to the MET 134. As another example, the query functionality and/or log data that is available to a user may be based on privileges that are assigned to the user and/or the MET 134 (e.g., via the MET configurations 138). Similarly, the table schema used by the MET 134 may be configurable from a set of predetermined table schemas.

In some embodiments, MET configurations 138 can be used for configuring a log level (e.g., which logs are collected as log data by the MET instance 506). In some aspects, rules for selecting a log level can include: (a) if a log level is set at object lineage and session parameter is not set then the object lineage value is used; (b) if a session parameter is set and no object lineage parameter is set then the session value is used; and (c) if both session and object lineage parameters are set then the more verbose value is used.

In some embodiments, the MET manager 132 can configure the MET 134 based on certain log visibility for certain users (e.g., certain users may be authorized to access only certain logs or log data in the MET 134).

In some embodiments, an event table schema associated with the MET 134 can include one or more of the following: a timestamp, an event type, a query ID, a session ID, a warehouse name, a warehouse ID, a database name, a database ID, a schema name, a schema ID, a source name, a source ID, a line name, a user name, a user ID, an owner role name, an owner role ID, a caller role name, a caller role ID, a log level, an event message, and extra information.

Figure 6:
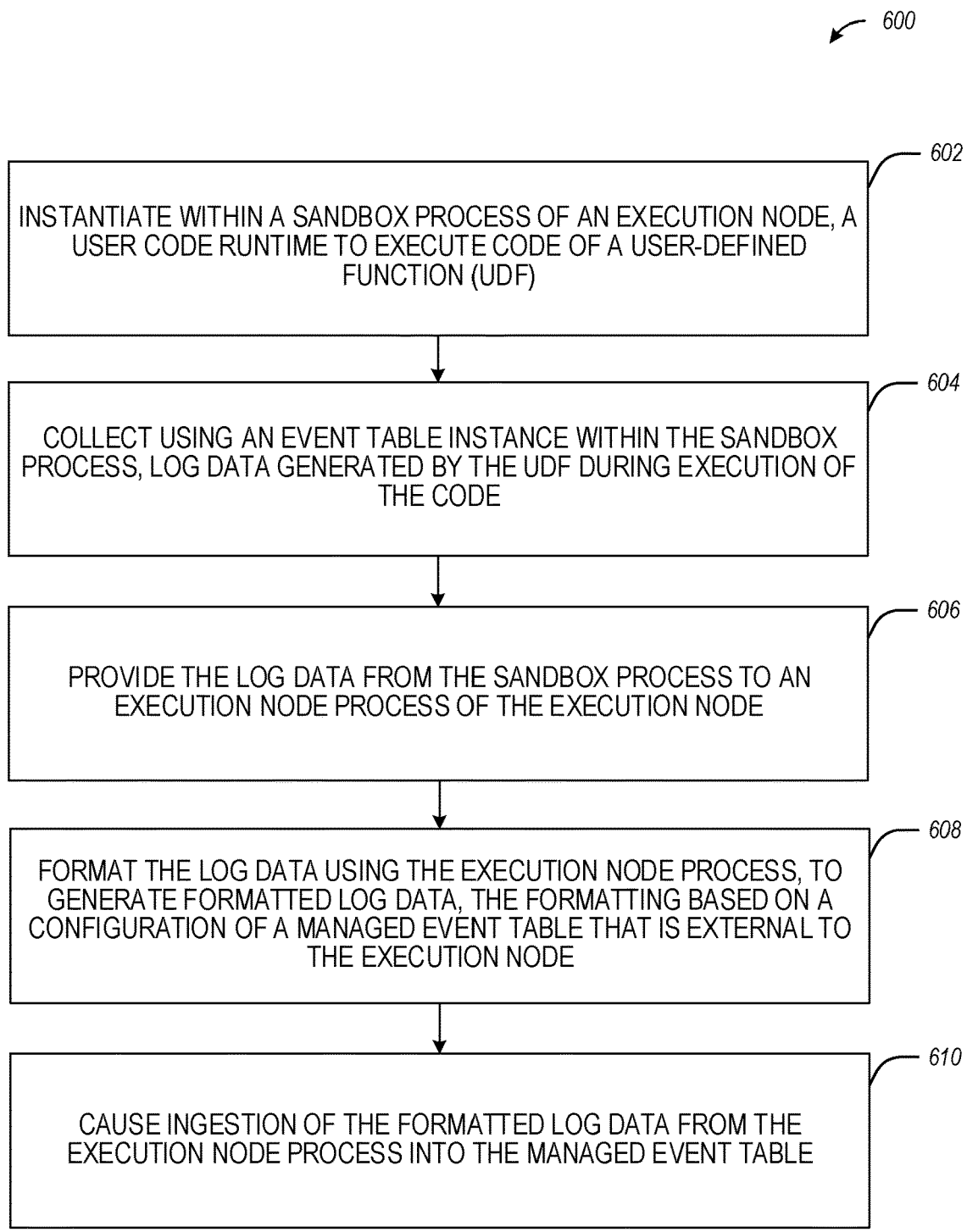
FIG. 6 is a flow diagram illustrating operations of a database system in performing a method for configuring managed event tables, in accordance with some embodiments of the present disclosure.

FIG. 6 is a flow diagram illustrating operations of a database system in performing a method 600 for configuring managed event tables, in accordance with some embodiments of the present disclosure. Method 600 may be embodied in computer-readable instructions for execution by one or more hardware components (e.g., one or more processors) such that the operations of the method 600 may be performed by components of the network-based database system 102, such as a network node (e.g., a MET manager 132 executing on a network node of the compute service manager 108) or a computing device (e.g., client device 114) which may be implemented as machine 700 of FIG. 7 performing the disclosed functions. Accordingly, method 600 is described below, by way of example with reference thereto. However, it shall be appreciated that method 600 may be deployed on various other hardware configurations and is not intended to be limited to deployment within the network-based database system 102.

At operation 602, a user code runtime (e.g., user code runtime 424) is instantiated within a sandbox process of an execution node (e.g., sandbox process 420 of execution node 302-1), to execute code of a user-defined function (UDF) (e.g., user code 430 of a UDF 504 can be executed by the sandbox process 420).

At operation 604, log data generated by the UDF during the execution of the code is collected using an event table instance within the sandbox process. For example, log data 508 generated during the execution of the UDF code of UDF 504 is collected by the MET instance 506 within the sandbox process 420.

At operation 606, the log data is provided from the sandbox process to an execution node process of the execution node. For example, log data 508 is provided from the sandbox process 420 to the execution node process 410 of the execution node 302-1.

At operation 608, the log data is formatted using the execution node process, to generate formatted log data. For example, log data 508 is formatted (e.g., by one or more of the MET components 413) to generate formatted log data. In some aspects, the formatting is based on a configuration (e.g., MET configurations 138) of a managed event table (e.g., MET 134) that is external to the execution node (e.g., MET 134 is part of the compute service manager 108 which is external to the execution node 302-1).

At 610, ingestion of the formatted log data from the execution node process into the managed event table can be caused/initiated. For example, ingestion of the formatted log data from table stage 411 into the MET 134 can be initiated based on communication between the ingestion component 502 and the ingestion scheduling component 514.

Figure 7:
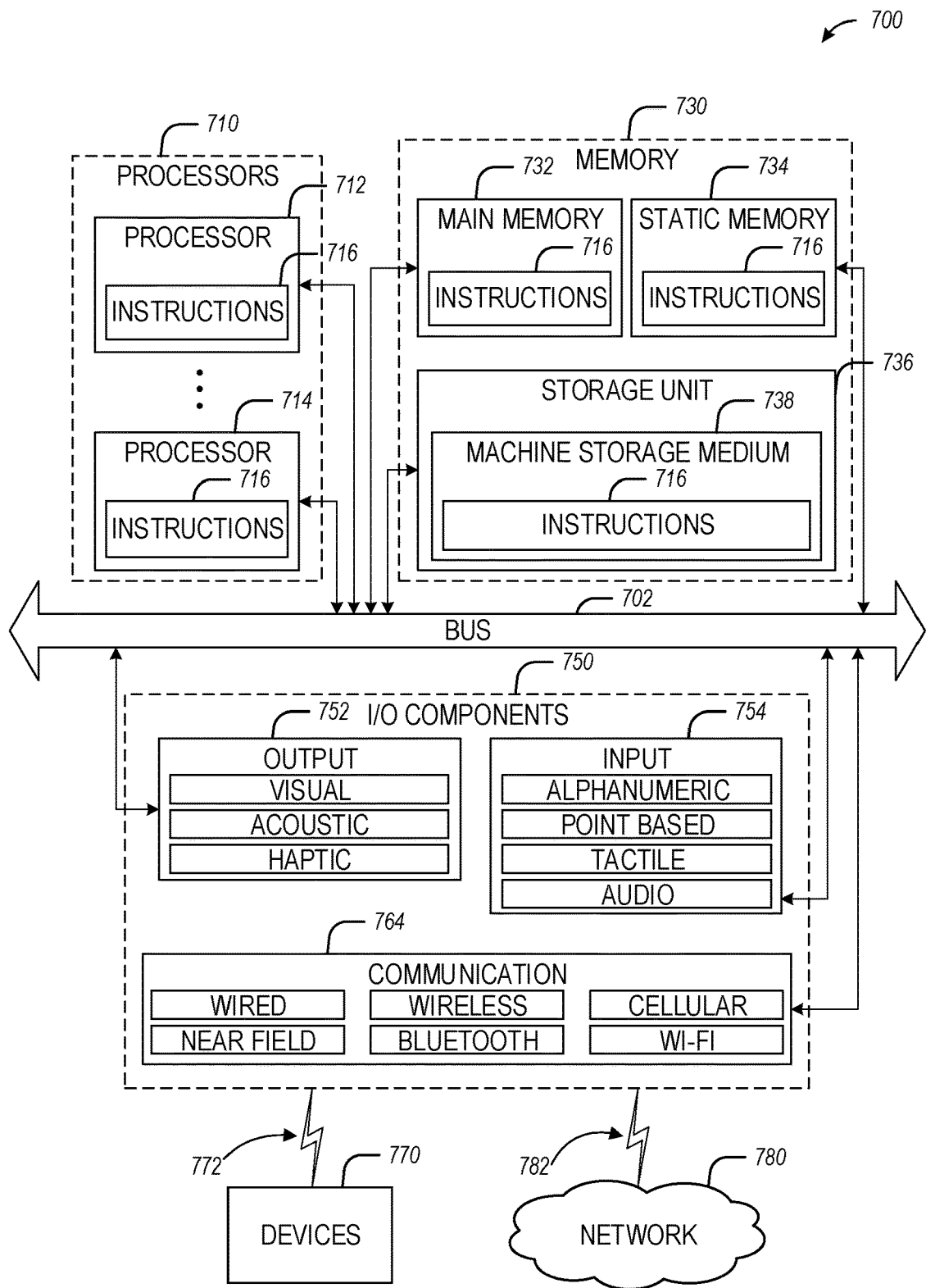
FIG. 7 illustrates a diagrammatic representation of a machine in the form of a computer system within which a set of instructions may be executed for causing the machine to perform any one or more of the methodologies discussed herein, in accordance with some embodiments of the present disclosure.

FIG. 7 illustrates a diagrammatic representation of a machine 700 in the form of a computer system within which a set of instructions may be executed for causing the machine 700 to perform any one or more of the methodologies discussed herein, according to an example embodiment. Specifically, FIG. 7 shows a diagrammatic representation of the machine 700 in the example form of a computer system, within which instructions 716 (e.g., software, a program, an application, an applet, an app, or other executable code) for causing the machine 700 to perform any one or more of the methodologies discussed herein may be executed. For example, instructions 716 may cause machine 700 to execute any one or more operations of method 600 (or any other technique discussed herein, for example in connection with FIG. 4-FIG. 6). As another example, instructions 716 may cause machine 700 to implement one or more portions of the functionalities discussed herein. In this way, instructions 716 may transform a general, non-programmed machine into a particular machine 700 (e.g., the client device 114, the compute service manager 108, or a node in the execution platform 110) that is specially configured to carry out any one of the described and illustrated functions in the manner described herein. In yet another embodiment, instructions 716 may configure the client device 114, the compute service manager 108, and/or a node in the execution platform 110 to carry out any one of the described and illustrated functions in the manner described herein.

In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a smartphone, a mobile device, a network router, a network switch, a network bridge, or any machine capable of executing the instructions 716, sequentially or otherwise, that specify actions to be taken by the machine 700. Further, while only a single machine 700 is illustrated, the term "machine" shall also be taken to include a collection of machines 700 that individually or jointly execute the instructions 716 to perform any one or more of the methodologies discussed herein.

Machine 700 includes processors 710, memory 730, and input/output (I/O) components 750 configured to communicate with each other such as via a bus 702. In some example embodiments, the processors 710 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 712 and a processor 714 that may execute the instructions 716. The term "processor" is intended to include multi-core processors 710 that may comprise two or more independent processors (sometimes referred to as "cores") that may execute instructions 716 contemporaneously. Although FIG. 7 shows multiple processors 710, the machine 700 may include a single processor with a single core, a single processor with multiple cores (e.g., a multi-core processor), multiple processors with a single core, multiple processors with multiple cores, or any combination thereof.

The memory 730 may include a main memory 732, a static memory 734, and a storage unit 736, all accessible to the processors 710 such as via the bus 702. The main memory 732, the static memory 734, and the storage unit 736 store the instructions 716 embodying any one or more of the methodologies or functions described herein. The instructions 716 may also reside, completely or partially, within the main memory 732, within the static memory 734, within machine storage medium 738 of the storage unit 736, within at least one of the processors 710 (e.g., within the processor's cache memory), or any suitable combination thereof, during execution thereof by the machine 700.

The I/O components 750 include components to receive input, provide output, produce output, transmit information, exchange information, capture measurements, and so on. The specific I/O components 750 that are included in a particular machine 700 will depend on the type of machine. For example, portable machines such as mobile phones will likely include a touch input device or other such input mechanisms, while a headless server machine will likely not include such a touch input device. It will be appreciated that the I/O components 750 may include many other components that are not shown in FIG. 7. The I/O components 750 are grouped according to functionality merely for simplifying the following discussion and the grouping is in no way limiting. In various example embodiments, the I/O components 750 may include output components 752 and input components 754. The output components 752 may include visual components (e.g., a display such as a plasma display panel (PDP), a light-emitting diode (LED) display, a liquid crystal display (LCD), a projector, or a cathode ray tube (CRT)), acoustic components (e.g., speakers), other signal generators, and so forth. The input components 754 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures or other tactile input components), audio input components (e.g., a microphone), and the like.

Communication may be implemented using a wide variety of technologies. The I/O components 750 may include communication components 764 operable to couple the machine 700 to a network 780 or devices 770 via a coupling 782 and a coupling 772, respectively. For example, the communication components 764 may include a network interface component or another suitable device to interface with the network 780. In further examples, the communication components 764 may include wired communication components, wireless communication components, cellular communication components, and other communication components to provide communication via other modalities. The device 770 may be another machine or any of a wide variety of peripheral devices (e.g., a peripheral device coupled via a universal serial bus (USB)). For example, as noted above, machine 700 may correspond to any one of the client device 114, the compute service manager 108, or the execution platform 110, and the devices 770 may include the client device 114 or any other computing device described herein as being in communication with the network-based database system 102 or the cloud storage platform 104.

The various memories (e.g., 730, 732, 734, and/or memory of the processor(s) 710 and/or the storage unit 736) may store one or more sets of instructions 716 and data structures (e.g., software) embodying or utilized by any one or more of the methodologies or functions described herein. These instructions 716, when executed by the processor(s) 710, cause various operations to implement the disclosed embodiments.

As used herein, the terms "machine-storage medium," "device-storage medium," and "computer-storage medium" mean the same thing and may be used interchangeably in this disclosure. The terms refer to single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 780 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 780 or a portion of the network 780 may include a wireless or cellular network, and the coupling 782 may be a Code Division Multiple Access (CDMA) connection, a Global System for Mobile communications (GSM) connection, or another type of cellular or wireless coupling. In this example, the coupling 782 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 716 may be transmitted or received over the network 780 using a transmission medium via a network interface device (e.g., a network interface component included in the communication components 764) and utilizing any one of several well-known transfer protocols (e.g., hypertext transfer protocol (HTTP)). Similarly, instructions 716 may be transmitted or received using a transmission medium via coupling 772 (e.g., a peer-to-peer coupling or another type of wired or wireless network coupling) to the device 770. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 716 for execution by the machine 700, and include digital or analog communications signals or other intangible media to facilitate communication of such software. Hence, the terms "transmission medium" and "signal medium" shall be taken to include any form of a modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of method 600 may be performed by one or more processors. The performance of certain of the operations may be distributed among the one or more processors, not only residing within a single machine but also deployed across several machines. In some example embodiments, the processor or processors may be located in a single location (e.g., within a home environment, an office environment, or a server farm), while in other embodiments the processors may be distributed across several locations.

Described implementations of the subject matter can include one or more features, alone or in combination as illustrated below by way of examples.

Example 1 is a system comprising: at least one hardware processor; and at least one memory storing instructions that cause the at least one hardware processor to perform operations comprising: instantiating a user code runtime to execute code of a user-defined function (UDF), the user code runtime instantiated within a sandbox process of an execution node; collecting using an event table instance within the sandbox process, log data generated by the UDF during execution of the code; providing the log data from the sandbox process to an execution node process of the execution node; formatting of the log data using the execution node process, to generate formatted log data, the formatting based on a configuration of a managed event table that is external to the execution node; and causing ingestion of the formatted log data from the execution node process into the managed event table.

In Example 2, the subject matter of Example 1 includes subject matter where the instructions further cause the at least one hardware processor to perform operations comprising: configuring the sandbox process with managed event table libraries, the managed event table libraries causing execution of the event table instance.

In Example 3, the subject matter of Examples 1-2 includes subject matter where the instructions further cause the at least one hardware processor to perform operations comprising: enriching at the execution node process, the log data with contextual metadata describing the log data, yielding enriched log data.

In Example 4, the subject matter of Example 3 includes subject matter where the contextual metadata comprises at least one of a timestamp identifying a time the log data was generated; a query identifier of a query causing the generation of the log data; a session identifier of a session during which the log data was generated; and a warehouse identifier of a virtual warehouse of computing resources that include the execution node.

In Example 5, the subject matter of Examples 3-4 includes subject matter where the instructions further cause the at least one hardware processor to perform operations comprising: storing the enriched log data at a table stage storage maintained by the execution node process.

In Example 6, the subject matter of Example 5 includes subject matter where the configuration comprises a format that is ingestible by the managed event table.

In Example 7, the subject matter of Example 6 includes subject matter where the instructions further cause the at least one hardware processor to perform operations comprising: formatting the enriched log data stored in the table stage storage into the format that is ingestible by the managed event table, yielding the formatted log data.

In Example 8, the subject matter of Example 7 includes subject matter where the instructions further cause the at least one hardware processor to perform operations comprising: scheduling the ingestion of the formatted log data into the managed event table, based on an indication the formatted log data is available at the table stage storage.

In Example 9, the subject matter of Examples 1-8 includes subject matter where the instructions further cause the at least one hardware processor to perform operations comprising: decoding a query for the log data generated by the UDF during execution of the code; executing the query using the formatted log data stored in the managed event table to generate a query result; and outputting the query result in response to the query.

In Example 10, the subject matter of Examples 1-9 includes subject matter where the instructions further cause the at least one hardware processor to perform operations comprising: collecting the log data further based on a data access privilege indicated by the configuration of the managed event table.

Example 11 is a method comprising: instantiating within a sandbox process of an execution node, a user code runtime to execute code of a user-defined function (UDF); collecting using an event table instance within the sandbox process, log data generated by the UDF during execution of the code; providing the log data from the sandbox process to an execution node process of the execution node; formatting of the log data using the execution node process, to generate formatted log data, the formatting based on a configuration of a managed event table that is external to the execution node; and causing ingestion of the formatted log data from the execution node process into the managed event table.

In Example 12, the subject matter of Example 11 includes, configuring the sandbox process with managed event table libraries, the managed event table libraries causing execution of the event table instance.

In Example 13, the subject matter of Examples 11-12 includes, enriching at the execution node process, the log data with contextual metadata describing the log data, yielding enriched log data.

In Example 14, the subject matter of Example 13 includes subject matter where the contextual metadata comprises at least one of a timestamp identifying a time the log data was generated; a query identifier of a query causing the generation of the log data; a session identifier of a session during which the log data was generated; and a warehouse identifier of a virtual warehouse of computing resources that include the execution node.

In Example 15, the subject matter of Examples 13-14 includes, storing the enriched log data at a table stage storage maintained by the execution node process.

In Example 16, the subject matter of Example 15 includes subject matter where the configuration comprises a format that is ingestible by the managed event table.

In Example 17, the subject matter of Example 16 includes, formatting the enriched log data stored in the table stage storage into the format that is ingestible by the managed event table, yielding the formatted log data.

In Example 18, the subject matter of Example 17 includes, scheduling the ingestion of the formatted log data into the managed event table, based on an indication the formatted log data is available at the table stage storage.

In Example 19, the subject matter of Examples 11-18 includes, decoding a query for the log data generated by the UDF during execution of the code; executing the query using the formatted log data stored in the managed event table to generate a query result; and outputting the query result in response to the query.

In Example 20, the subject matter of Examples 11-19 includes, collecting the log data further based on a data access privilege indicated by the configuration of the managed event table.

Example 21 is a computer-readable medium comprising instructions that, when executed by one or more processors of a machine, configure the machine to perform operations comprising: instantiating within a sandbox process of an execution node, a user code runtime to execute code of a user-defined function (UDF); collecting using an event table instance within the sandbox process, log data generated by the UDF during execution of the code; providing the log data from the sandbox process to an execution node process of the execution node; formatting of the log data using the execution node process, to generate formatted log data, the formatting based on a configuration of a managed event table that is external to the execution node; and causing ingestion of the formatted log data from the execution node process into the managed event table.

In Example 22, the subject matter of Example 21 includes, configuring the sandbox process with managed event table libraries, the managed event table libraries causing execution of the event table instance.

In Example 23, the subject matter of Examples 21-22 includes, enriching at the execution node process, the log data with contextual metadata describing the log data, yielding enriched log data.

In Example 24, the subject matter of Example 23 includes subject matter where the contextual metadata comprises at least one of a timestamp identifying a time the log data was generated; a query identifier of a query causing the generation of the log data; a session identifier of a session during which the log data was generated; and a warehouse identifier of a virtual warehouse of computing resources that include the execution node.

In Example 25, the subject matter of Examples 23-24 includes, storing the enriched log data at a table stage storage maintained by the execution node process.

In Example 26, the subject matter of Example 25 includes subject matter where the configuration comprises a format that is ingestible by the managed event table.

In Example 27, the subject matter of Example 26 includes, formatting the enriched log data stored in the table stage storage into the format that is ingestible by the managed event table, yielding the formatted log data.

In Example 28, the subject matter of Example 27 includes, scheduling the ingestion of the formatted log data into the managed event table, based on an indication the formatted log data is available at the table stage storage.

In Example 29, the subject matter of Examples 21-28 includes, decoding a query for the log data generated by the UDF during execution of the code; executing the query using the formatted log data stored in the managed event table to generate a query result; and outputting the query result in response to the query.

In Example 30, the subject matter of Examples 21-29 includes, the operations further comprising: collecting the log data further based on a data access privilege indicated by the configuration of the managed event table.

Example 31 is at least one machine-readable medium including instructions that, when executed by processing circuitry, cause the processing circuitry to perform operations to implement any of Examples 1-30.

Example 32 is an apparatus comprising means to implement any of Examples 1-30.

Example 33 is a system to implement any of Examples 1-30.

Example 34 is a method to implement any of Examples 1-30.

Although the embodiments of the present disclosure have been described concerning specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is disclosed. Thus, although specific embodiments have been illustrated and described herein, it should be appreciated that any arrangement calculated to achieve the same purpose may be substituted for the specific embodiments shown. This disclosure is intended to cover any adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A system comprising:
    at least one hardware processor; and
    at least one memory storing instructions that cause the at least one hardware processor to perform operations comprising:
        generating at a first process of an execution node, log data associated with execution of user-defined function (UDF) code;
        providing the log data from the first process to a second process of the execution node, the first process executing as a sub-process of the second process;
        retrieving a configuration of a managed event table from a computing node that is external to the execution node;
        formatting the log data using the second process of the execution node, to generate formatted log data, the formatting based on the configuration of the managed event table retrieved from the computing node and including at least a log data enrichment process; and
        causing communication of the formatted log data from the second process of the execution node into a managed event table maintained at the computing node that is external to the execution node.

2. The system of claim 1, wherein the instructions further cause the at least one hardware processor to perform operations comprising:
    instantiating a user code runtime to execute the UDF code, the user code runtime instantiated within the first process of the execution node.

3. The system of claim 1, wherein the instructions further cause the at least one hardware processor to perform operations comprising:
    collecting using an event table instance executing within the first process, log data generated by the execution of the UDF code.

4. The system of claim 3, wherein the instructions further cause the at least one hardware processor to perform operations comprising:
configuring the first process with managed event table libraries, the managed event table libraries causing execution of the event table instance.

5. The system of claim 1, wherein the instructions to perform the log data enrichment process further cause the at least one hardware processor to perform operations comprising:
enriching by the second process, the log data with contextual metadata describing the log data, yielding enriched log data.

6. The system of claim 5, wherein the contextual metadata comprises at least one of:
a timestamp identifying a time the log data was generated;
a query identifier of a query causing the generation of the log data;
a session identifier of a session during which the log data was generated; and
a warehouse identifier of a virtual warehouse of computing resources that include the execution node.

7. The system of claim 5, wherein the instructions further cause the at least one hardware processor to perform operations comprising:
storing the enriched log data at a table stage storage maintained by the execution node process.

8. The system of claim 7, wherein the configuration comprises a format that is ingestible by the managed event table, and wherein the instructions further cause the at least one hardware processor to perform operations comprising:
formatting the enriched log data stored in the table stage storage into the format that is ingestible by the managed event table, yielding the formatted log data.

9. The system of claim 8, wherein the instructions further cause the at least one hardware processor to perform operations comprising:
scheduling ingestion of the formatted log data into the managed event table, based on an indication the formatted log data is available at the table stage storage.

10. The system of claim 1, wherein the instructions further cause the at least one hardware processor to perform operations comprising:
decoding a query for the log data generated by a UDF during execution of the UDF code;
executing the query using the formatted log data stored in the managed event table to generate a query result; and
outputting the query result in response to the query.

11. A method comprising:
generating by at least one hardware processor and at a first process of an execution node, log data associated with execution of user-defined function (UDF) code;
providing the log data from the first process to a second process of the execution node, the first process executing as a sub-process of the second process;
retrieving a configuration of a managed event table from a computing node that is external to the execution node;
formatting the log data using the second process of the execution node, to generate formatted log data, the formatting based on the configuration of the managed event table retrieved from the computing node and including at least a log data enrichment process; and
causing communication of the formatted log data from the second process of the execution node into a managed event table maintained at the computing node that is external to the execution node.

12. The method of claim 11, further comprising:
instantiating a user code runtime to execute the UDF code, the user code runtime instantiated within the first process of the execution node.

13. The method of claim 11, further comprising:
collecting using an event table instance executing within the first process, log data generated by the execution of the UDF code.

14. The method of claim 13, further comprising:
configuring the first process with managed event table libraries, the managed event table libraries causing execution of the event table instance.

15. The method of claim 11, wherein performing the log data enrichment process further comprises:
enriching by the second process, the log data with contextual metadata describing the log data, yielding enriched log data.

16. The method of claim 15, wherein the contextual metadata comprises at least one of:
a timestamp identifying a time the log data was generated;
a query identifier of a query causing the generation of the log data;
a session identifier of a session during which the log data was generated; and
a warehouse identifier of a virtual warehouse of computing resources that include the execution node.

17. The method of claim 15, further comprising:
storing the enriched log data at a table stage storage maintained by the execution node process.

18. The method of claim 17, wherein the configuration comprises a format that is ingestible by the managed event table, and the method further comprising:
formatting the enriched log data stored in the table stage storage into the format that is ingestible by the managed event table, yielding the formatted log data.

19. The method of claim 18, further comprising:
scheduling ingestion of the formatted log data into the managed event table, based on an indication the formatted log data is available at the table stage storage.

20. The method of claim 11, further comprising:
decoding a query for the log data generated by a UDF during execution of the UDF code;
executing the query using the formatted log data stored in the managed event table to generate a query result; and
outputting the query result in response to the query.

21. A computer-storage medium comprising instructions that, when executed by one or more processors of a machine, configure the machine to perform operations comprising:
generating by at least one hardware processor and at a first process of an execution node, log data associated with execution of user-defined function (UDF) code;
providing the log data from the first process to a second process of the execution node, the first process executing as a sub-process of the second process;
retrieving a configuration of a managed event table from a computing node that is external to the execution node;
formatting the log data using the second process of the execution node, to generate formatted log data, the formatting based on the configuration of the managed event table retrieved from the computing node and including at least a log data enrichment process; and
causing communication of the formatted log data from the second process of the execution node into a managed event table maintained at the computing node that is external to the execution node.

22. The computer-storage medium of claim 21, the operations further comprising:
    instantiating a user code runtime to execute the UDF code, the user code runtime instantiated within the first process of the execution node.

23. The computer-storage medium of claim 21, the operations further comprising:
    collecting using an event table instance executing within the first process, log data generated by the execution of the UDF code.

24. The computer-storage medium of claim 23, the operations further comprising:
    configuring the first process with managed event table libraries, the managed event table libraries causing execution of the event table instance.

25. The computer-storage medium of claim 21, wherein the operations to perform the log data enrichment process further comprise:
    enriching by the second process, the log data with contextual metadata describing the log data, yielding enriched log data.

26. The computer-storage medium of claim 25, wherein the contextual metadata comprises at least one of:
    a timestamp identifying a time the log data was generated;
    a query identifier of a query causing the generation of the log data;
    a session identifier of a session during which the log data was generated; and
    a warehouse identifier of a virtual warehouse of computing resources that include the execution node.

27. The computer-storage medium of claim 25, the operations further comprising:
    storing the enriched log data at a table stage storage maintained by the execution node process.

28. The computer-storage medium of claim 27, wherein the configuration comprises a format that is ingestible by the managed event table, and the operations further comprising:
    formatting the enriched log data stored in the table stage storage into the format that is ingestible by the managed event table, yielding the formatted log data.

29. The computer-storage medium of claim 28, the operations further comprising:
    scheduling ingestion of the formatted log data into the managed event table, based on an indication the formatted log data is available at the table stage storage.

30. The computer-storage medium of claim 21, the operations further comprising:
    decoding a query for the log data generated by a UDF during execution of the UDF code;
    executing the query using the formatted log data stored in the managed event table to generate a query result; and
    outputting the query result in response to the query.

* * * * *